United States Patent Office 3,629,441
Patented Dec. 21, 1971

3,629,441
COMPOSITIONS CONTAINING PHYSIOLOGI-
CALLY ACTIVE KAWA COMPOUNDS, PROC-
ESS OF MAKING SAME, AND METHOD OF
USING SAME IN THERAPY
Hans Braeuer, Vaterstetten, near Munich, and Hans
Brinkhoff, Munich, Germany, assignors to Spezial-
chemie Gesellschaft mit beschrankter Haftung und Co.,
Arzneimittelfabrik, Munich, Germany
No Drawing. Filed June 4, 1968, Ser. No. 734,218
Claims priority, application Germany, June 5, 1967,
S 110,180
Int. Cl. A61k 27/14
U.S. Cl. 424—279
16 Claims

ABSTRACT OF THE DISCLOSURE

Compositions comprising solutions of at least two and preferably two or three physiologically active kawa compounds dissolved in solvents of the type of saturated and unsaturated vegetable and animal oils, polyglycols and their derivatives, 2,2-dimethyl-4-hydroxy methyl-1,3-dioxolane, dimethyl sulfoxide and other solvents which are compatible with said kawa compounds and are stable and do not decompose or polymerize even on prolonged storage. The preferred kawa compounds in said solutions are yangonin, kawain, dihydrokawain, dehydrokawain. Methysticin is excluded since it causes undesirable side effects. Highly concentrated solutions of said kawa compounds of a surprisingly high endo-anesthetic, muscle relaxant, sleep-inducing, and psychotropic-ataractic activity are obtained. The preferred procedure of producing such solutions comprises dissolving the mixture of the kawa compounds in the solvent while finely comminuting and heating the solvent and the mixture, preferably to a temperature above the melting point of the kawa compound with the highest melting point. Preferred mixtures are those of yangonin and kawain or of yangonin, kawain and dihydrokawain.

BACKGROUND OF INVENTION

Field of invention

The present invention relates to valuable pharmaceutical compositions and more particularly to pharmaceutical compositions having surprisingly high endo-anesthetic activity, to a process of making same and to a process of using same in therapy.

Description of the prior art

It has been known for more than 100 years that the roots and certain parts of the stem of the shrub *Piper methysticum* Forster, known to the trade as kawa-kawa, contain a number of pyrone compounds. Six lactones and two chalcones have been isolated from the rhizoma and roots of the kawa plant, among them yangonin, methysticin, kawain, and the dihydro compounds of kawain and methysticin.

Certain physiological and pharmacological properties of such compounds and of their mixtures are also known. Thus, for instance, Haensel and Beiersdorff in "Arzneimittel-Forchung" vol. 2, p. 581 (1959) have shown that dihydrokawain and dihydromethysticin have sedative activity. Klohs et al. in "Journ. Med. Pharm. Chem." vol. 1, p. 95 (1959) have discovered that the sedative effect of the kawa root evidently is due to a summation effect of all the lactones in the kawa plant. These authors were able to demonstrate the existence of such a summation effect by mixing the purified lactones in the proportion in which they had been isolated from the plant. Nickl and Keck have shown in British Patent No. 943,121 that mixtures of yangonin and methysticin have a stronger sedative and anticonvulsive effect than the individual components and also than mixtures of all the six lactones present in nature or as produced artificially.

Meyer and collaborators have found that natural kawa lactones possess anticonvulsive, local anesthetic, narcosis increasing, styrchnine antagonistic, antiphlogistic, and spasmolytic activity. See, for instance, Naunyn-Schmiedeberg's "Arch. Exp. Path. Pharmakol." vol. 245, p. 122; "Klinische Wochenschrift" vol. 42, p. 407; vol. 43, p. 469; vol. 44, p. 902; "Arch. Int. Pharmacodyn. Ther." vol. 148, p. 97; vol. 138, p. 505; vol. 150, p. 118; vol. 154, p. 449; "Arzneimittel-Forschung" vol. 15, p. 1344; vol. 13, p. 407.

These known preparations, however, are not very effective or they cause undesired side effects. Thus, for instance, the mixture of yangonin and methysticin produces skin rashes and eruptions and discoloration of the skin on prolonged administration. Therefore, the known preparations have not found extensive application in therapy.

SUMMARY OF THE INVENTION

It is one object of the present invention to provide new and valuable compositions containing two and more physiologically effective kawa compounds, said compositions possessing heretofore unkown pharmacological and physiological properties, the most important one of said properties being their endo-anesthetic activity which renders said compositions useful sleep-inducing agents.

Another object of the present invention is to provide a simple and effective process of making such endo-anesthetic and sleep-inducing compositions.

A further object of the present invention is to provide a process of using such compositions as endo-anesthetic and sleep-inducing agents in therapy.

Other objects of the present invention and advantageous features thereof will become apparent as the description proceeds.

In principle the compositions according to the present invention are characterized by containing two or more active kawa compounds in the form of solution in specific suitable solvents. Especially suitable solvents are saturated and unsaturated fatty oils and more particularly vegetable and animal oils. The preferred oils are arachis oil, soybean oil, sunflower seed oil, linseed oil, neat's-foot oil and other saturated and unsaturated fatty acid glycerides. Polyglycols, i.e. polyethylene oxides of the formula $H(OCH_2 \cdot CH_2)_nOH$ and their esters with fatty acids and other derivatives of such polyglycols, 2,2-dimethyl-4-hydroxy methyl-1,3-dioxolane, dimethyl sulfoxide either alone or in mixture with each other or the above mentioned saturated and unsaturated oils are also useful solvents for producing the compositions according to the present invention.

The term "solvents" as used hereinafter and in the claims annexed hereto comprises all solvents which are capable of dissolving the active kawa compounds and are compatible therewith and which are stable and do not polymerize or decompose even on prolonged storage.

Surprisingly it was found that such solutions have a high endo-anesthetic activity and can advantageously be used as sleep-inducing agents. Such solutions are characterized by three pronounced physiological properties as follows:

(1) They have a high endo-anesthetic activity as demonstrated by the method described by Zipf et al. in "Arch. Exper. Path. Pharm." vol. 217, page 472 (1953); "Arzneimittel-Forschung" vol. 7, page 1925 (1957). That they subdue or even suppress sensitive interoceptors, i.e. cause endo-anesthesia, is demonstrated by the tracheal closure reaction according to Head.

(2) They have a noteworthy muscle relaxant activity as demonstrated by their action on spinal reflexes, such as transmission of neuromuscular impulses, crossed stretch reflex, dorsal skin reflex, pinar reflex, and also on spontaneous reflexes such as patellar tendon reflex, tonic extensor reflex.

(3) The psychotropic-ataractic activity of said compositions is best proved by its effect on the spontaneous electro-encephalogram and the electro-encephalogram-arousal reaction, i.e. by its effect on the electrically induced spontaneous activity of the sensomotoric cortex as well as by its effect on the electro-encephalogram-arousal reaction on electric stimulation of the formatio reticularis of the mesencephalon.

The muscle relaxant activity, the endo-anesthetic activity, and the psychotropic-ataractic activity of such solutions according to the present invention are of special importance in therapy. In addition thereto solutions according to the present invention have an excellent sleep-inducing effect without causing any undesirable side effects.

Heretofore the use of compounds of this type for such therapeutic purposes was not known. It was merely known that d,l-methysticin and d,l-dihydromethysticin can therapeutically be used as anticonvulsive agents. A mixture of all the kawa pyrones in a proportion similar to that in which they had been isolated from the plant as well as a mixture of yangonin and methysticin as mentioned hereinabove have a sedative and anticonvulsive activity but none of the many references referring to the physiological properties of kawa pyrones discloses endo-anesthetic or muscle relaxant and psychotropic-ataractic properties.

Especially valuable compositions according to the present invention contain yangonin and kawain and/or dihydrokawain as well as their derivatives such as dehydrokawain, 5,6 - dehydro - 7,8-dihydrokawain, flavonoid compounds of kawa pyrones such as flavokavine A and B, and others. Two or more of such active kawa pyrones and preferably the three kawa pyrones yangonin, kawain, and dihydrokawain are present in such compositions in the form of their solutions in the above mentioned solvents.

The individual active kawa compounds, especially yangonin have a very low solubility in the above mentioned solvents as well as in other solvents so that their solutions are therapeutically of no or only limited value due to the low concentration of the active agent therein. Therefore, the kawa pyrones were usually administered in solid form, for instance, in the form of tablets, dragees, capsules, as suppositories or as suspensions. In contrast thereto it was found that, when using yangonin and another or several of the above mentioned active kawa compounds, the solubility of these compounds in the solution of their mixture is considerably increased so that solutions of such a high concentration can be obtained that they can be used therapeutically for purposes for which the heretofore obtainable solutions of low concentration were unsuitable. Yangonin, for instance, is soluble in saturated or unsaturated vegetable oils only to a very slight extent. When mixed with other active kawa pyrones, however, highly concentrated solutions which have an unexpectedly higher therapeutic activity than the heretofore prepared solutions of the individual kawa pyrones of low concentration, were obtained.

According to a preferred embodiment of the present invention solutions containing about 20% to 80% of yangonin and about 80% to 20% of kawain, dihydrokawain, 7,8-dihydro-5,6-dehydrokawain have proved to be especially useful. Preferred solutions of yangonin with mixtures of the other above mentioned kawa pyrone compounds contain 20% to 80% of yangonin and 80% to 20% of such mixtures whereby the other kawa pyrone compounds are preferably present in equal amounts. It has also been found that it does not make much difference whether mixtures of yangonin with the d,l-forms of the kawa pyrones or with their d-forms are produced. The l-form of the kawa pyrones, however, is less effective.

In contrast to the known mixture of yangonin and methysticin which is not used in the form of a solution, the solutions of mixtures of yangonin and kawa pyrones, according to the present invention, are free of the undesirable side effects of said known mixture. It is quite surprising that the solutions according to the present invention which contain yangonin and kawain, dihydrokawain, dehydrokawain, and/or the other kawa pyrones but no methysticin do not produce skin efflorescences and discolorations.

The manner in which the solutions are prepared may vary. For instance, first mixtures of the solid active kawa compounds may be prepared which are then dissolved in the solvent. Or the active kawa compounds may successively be dissolved in the solvent. The preferred method is the method starting with mixtures of comminuted solid active kawa compounds.

It is the preferred procedure to very finely comminute the active kawa compounds and thereby to intimately mix the same whereafter the mixture is dissolved in the oil or other solvents, preferably with heating.

According to an especially advantageous method of preparing the compositions according to the present invention, the mixture of the active kawa compounds is dissolved in the solvent at a temperature corresponding to the melting point of the compounds to be dissolved or, respectively, being above the melting point of the kawa compound with the highest melting point. Preferably the temperature is not substantially higher than 5° C. above the melting point of the highest melting kawa pyrone compound. Thereby, apparently micellary solutions are obtained, i.e. solutions containing aggregates of dissolved molecules or so-called association colloids, which are formed by association of numerous individual molecules and are held together by covalences.

The resulting solutions which are somewhat turbid are clarified, for instance, by pressure filtration.

These solutions can be sterilized and can be processed to galenicals. They may be filled, for instance, into gelatin capsules or special tablets with suitable pharmaceutical excipients, such as stearates, talc, and saturated or unsaturated fatty acids, suppositories, and others may be prepared. The concentration of the active kawa compounds in the solution is chosen as high as possible. Of course, care must be taken that an excess of initially dissolved kawa compounds does not precipitate on standing. Depending upon the composition of the kawa compounds solutions of a concentration of at least 2% and preferably between 30% and 50%, calculated for the solvent, can be obtained especially when using yangonin as the one component.

As stated above, the resulting solutions exhibit a surprisingly high synergistic increase of the endo-anesthetic, muscle relaxant, sleep-inducing, and psychlotropic-ataractic activity when compared with the respective activities of each individual active kawa compound.

The solutions according to the present invention have proved to be of considerable value in the treatment of disturbances of the heart rhythm, paroxysmal tachycardia variations in the blood pressure due to nervous impulse disturbances, muscular spasms, neuroses, disturbances affecting the ability to fall sleep; bronchial asthma. Especially valuable is the sleep-inducing effect of the solutions.

The compositions according to the present invention are preferably orally administered. The minimum single dose is between 50 mg. and 75 mg. The maximum daily dose may be as high as 1.2 g.

DESCRIPTION OF THE PREFERRED EMBODIMENTS

The following examples serve to illustrate the present invention without, however, limiting the same hereto.

Example 1

160 g. of kawain and 40 g. of yangonin are intimately mixed with each other and are finely cominuted with 600 g. of arachis oil in an "Ultraturax" mixer while being heated to between about 120° C. and 150° C. After homogeneous mixture is achieved, 50 g. of glycerol are admixed and, the resulting solution is filled into elongated gelatin capsules. The glycerol addition serves to prevent hardening of the walls of the gelatin capsules. The kawain pyrones are present in a highly concentrated solution containing about 33% of active kawa pyrones (yangonin and kawain), calculated for the amount of arachis oil used. Each capsule contains about 850 mg. of solution and about 200 mg. of the kawa pyrone mixture of 20% of yangonin and 80% of kawain.

Example 2

90 g. of yangonin, 105 g. of dihydrokawain, and 105 g. of kawain are intimately mixed and finely comminuted with 200 g. of olive oil, 200 g. of polyethylene glycol 400, and 200 g. of soybean oil while heating to 140° C. The resulting solution is filled into gelatin capsules. Each capsule contains about 900 mg. of the solution and 300 mg. of the kawa pyrone mixture of 30% of yangonin, 35% of dihydrokawain, and 35% of kawain, corresponding to about 50%, calculated for the amount of solvents used.

Example 3

100 g. of yangonin, 137.5 g. of dihydrokawain, and 12.5 g. of kawa flavokavin, i.e the yellow dyestuff isolated from kawa roots, said flavokavin being chemically 2-hydroxy-4',4',6-trimethoxy chalcon and its 4-desmethoxy derivative, are intimately mixed and finely comminuted with 400 g. of glycerol tripalmitate and 200 g. of polyethylene glycol 300 while heating to 130–140° C. After mixing, the resulting solution is filled into gelatin capsules. Each capsule contains about 850 mg. of the solution and 250 mg. of the kawa pyrone mixture of 40% of yangonin, 55% of dihydrokawain, and 5% of flavokavin, corresponding to about 42%, calculated for the amount of solvent used.

Compositions containing yangonin are the preferred compositions. Yangonin, although it does not increase the activity of the other kawa pyrones, causes a more rapid onset and a prolongation of their therapeutic effect. Other compositions which do not contain yangonin, however, have also proved to be highly effective endo-anesthetic agents.

Example 4

100 g. of kawain, 100 g. of dihydromethysticin, and 50 g. of dihydrokawain are intimately mixed and finely comminuted with 250 g. of sunflower seed oil, 150 g. of linseed oil, and 200 g. of soybean oil while heating to 150° C. After cooling, the resulting solution is filled into gelatin capsules. Each capsule contains about 850 mg. of the solution and 250 mg. of the kawa pyrone mixture of 40% of kawain, 40% of dihydromethysticin, and 20% of dehydrokawain, corresponding to about 42% calculated for the amount of solvents used.

As stated hereinabove, other kawa pyrones with the exception of methysticin and other active compounds present in and isolated from kawa roots and rhizoma and other suitable solvents than those used in the preceding examples may be employed in producing the compositions according to the present invention. Other active kawa compounds which have recently been isolated from the kawa root are ketones such as cinnamal acetone and methylene dioxy-3,4-cinnamal acetone.

As stated above, the compositions according to the present invention have a surprisingly high endo-anesthetic activity and act as sleep-inducing agents. Thus these compositions represent a noteworthy advancement in therapy since only very few sleep-inducing agents and no endo-anesthetic agents are known.

The endo-anesthetic activity as well as the sleep-inducing activity of the new compositions have been demonstrated pharmacologically according to the method of Head in guinea pigs. Their muscle relaxing activity has also been proven by pharmacological tests.

Clinical tests on humans and animals have shown that the kawa pyrone compositions according to the present invention do not cause sedation in endo-anesthetically effective doses. In addition they have a noteworthy anti-fibrillatory effect and their physiological effects are relatively prolonged. Substantially no side effects have been observed.

Although the preferred mode of administration is the oral administration, preferably in the form of capsules as described in the preceding examples, it is also possible to administer the compositions according to the present invention parenterally or rectally in the form of suppositories.

The following example describes the preparation of a parenterally administrable composition without, however, being limited thereto.

Example 5

100 g. of kawain, 100 g. of dihydrokawain, and 50 g. of yangonin are dissolved in 5000 g. of polyethylene glycol 300. The solution is filled in ampoules, each containing about 2.1 g. of the solution, i.e. about 100 mg. of the active kawa compounds per ampoule. The solution is administered intravenously. Ethanol may be added to the solution or ethanolic solutions may also be used.

It is also possible to dissolve such a mixture of kawa compounds in a highly purified vegetable or animal oil as used for injection.

Suppositories may be prepared by incorporating the mixture of kawa compounds in polyethylene glycols of the molecular weight 1000 to 4000 or in conventional suppository bases of cocoa butter or other materials.

It is also possible to prepare said compositions in the form of tablets. For this purpose the mixture of the active kawa compounds dissolved in polyethylene glycol is intimately compounded with the conventional excipients to form a compound which can be compressed to tablets. It is also possible to produce gelatinized tablets of fatty or waxy materials as this is known to the art of pharmaceutical compounding.

Of course, many changes and variations in the components of the compositions according to the present invention, in the solvents used, in the process of preparing the solutions, in the pharmaceutical compositions prepared, in the mode of their clinical administration and the dosages administered, and the like may be made by those skilled in the art in accordance with the principles set forth herein and in the claims annexed hereto.

We claim:

1. Composition containing physiologically active kawa compounds with endo-anesthetic, muscle relaxant, sleep-inducing, and psychotropic-ataractic activity, said composition consisting essentially of a solution of at least two physiologically active kawa compounds selected from the group consisting of kawain, yangonin, dihydrokawain, dehydrokawain, 5,6-dehydro-7,8-dihydrokawain, flavokavine A, and flavokavine B in a stable, pharmaceutically acceptable solvent for said kawa compounds, said solvent being compatible with the kawa compounds and not polymerizing and not decomposing on prolonged storage, said solvent being selected from the group consisting of pharmaceutically acceptable saturated and unsaturated vegetable and animal oils, polyethylene glycols and their liquid esters with fatty acids, 2,2-dimethyl-4-hydroxy methyl-1,3-dioxolane, dimethyl sulfoxide, fatty acid glycerides, and mixtures of said solvents, said kawa compounds being present in said composition in a therapeutically effective amount, one of said kawa compounds being present in said composition in an amount of at least about 20% of the total amount of said kawa compounds.

2. Composition according to claim 1, wherein the vegetable oil is arachis oil.

3. Composition according to claim 1, wherein the vegetable oil is soybean oil.

4. Composition according to claim 1, wherein the polyglycol is polyethylene glycol.

5. Composition according to claim 1, wherein the fatty acid glyceride is glycerol tripalmitate.

6. Composition according to claim 1, wherein the kawa compounds are present in the solution in an amount between about 2% and about 50%, calculated for the amount of solvent used.

7. Composition according to claim 1 containing in solution a mixture composed of between about 20% and 80% of yangonin and between about 80% and 20% of at least one other kawa compound.

8. Composition according to claim 1 containing in solution a mixture composed of about 20% of yangonin and about 80% of kawain.

9. Composition according to claim 1 containing in solution a mixture composed of about 30% of yangonin, about 35% of kawain, and about 35% of dihydrokawain.

10. In a process of producing a solution of at least two physiologically active kawa compounds, the steps which comprise producing a finely divided mixture of at least two physiologically active kawa compounds selected from the group consisting of kawain, yangonin, dihydrokawain, dehydrokawain, 5,6-dehydro - 7,8 - dihydrokawain, flavokavine A, and flavokavine B and dissolving with heating said mixture in a stable, pharmaceutically acceptable solvent for said kawa compounds, said solvent being compatible with the kawa compounds and not polymerizing and not decomposing on prolonged storage, said solvent being selected from the group consisting of pharmaceutically acceptable saturated and unsaturated vegetable and animal oils, polyethylene glycols and their liquid esters with fatty acids, 2,2-dimethyl-4-hydroxy methyl-1,3-dioxolane, dimethyl sulfoxide, fatty acid glycerides, and mixtures of said solvents, the amounts of said kawa compounds in the resulting solution being therapeutically effective amounts, one of said kawa compounds being present in said composition in an amount of at least about 20% of the total amount of said kawa compounds.

11. The process according to claim 10, wherein solution is achieved by heating the mixture of solvent and kawa compounds at a temperature of about the melting point of said kawa compounds while comminuting said mixture.

12. The process according to claim 10, wherein solution is achieved by heating the mixture of solvent and kawa compounds at a temperature above the melting point of the kawa compound having the highest melting point.

13. The process according to claim 10 wherein the amount of kawa compounds in the solution is between about 2% and about 50%, calculated for the amount of solvent used.

14. A method of producing endo-anesthetic effects in humans and animals, said method comprising orally administering to humans and animals a therapeutically effective dose of a concentrated solution of at least two physiologically active kawa compounds selected from the group consisting of kawain, yangonin, dihydrokawain, dehydrokawain, 5,6 - dehydro - 7,8 - dihydrokawain, flavokavine A, and flavokavine B in a stable pharmaceutically acceptable solvent for said kawa compounds, said solvent being compatible with the kawa compounds and not polymerizing and not decomposing on prolonged storage, said solvent being selected from the group consisting of pharmaceutically acceptable saturated and unsaturated vegetable and animal oils, polyethylene glycols and their liquid esters with fatty acids, 2,2-dimethyl - 4 - hydroxy methyl - 1,3 - dioxolane, dimethyl sulfoxide, fatty acid glycerides, and mixtures of said solvents, the amounts of said kawa compounds in the resulting solution being therapeutically effective amounts, one of said kawa compounds being present in said composition in an amount of at least about 20% of the total amount of said kawa compounds.

15. The method according to claim 14, wherein an amount of solution which contains at least 50 mg. of the kawa compounds is orally administered per dose.

16. Pharmaceutical composition consisting essentially of at least two physiologically active kawa compounds selected from the group consisting of kawain, yangonin, dihydrokawain, dehydrokawain, 5,6-dehydro-7,8-dihydrokawain, flavokavine A, and flavokavine B, said composition containing said kawa compounds in a proportion between about 20% and about 80% of yangonin and between about 80% and about 20% of at least one other of the kawa compounds, and of a pharmaceutically acceptable solvent for said kawa compounds, said solvent being selected from the group consisting of pharmaceutically acceptable vegetable and animal oils and polyethyleneglycols, said kawa compounds being present in said composition in an amount between about 2% and about 50%, calculated for the amount of solvent used.

References Cited
FOREIGN PATENTS 943,121    5/1962    Great Britain _____ 424—279

SAM ROSEN, Primary Examiner

U.S. Cl. X.R.

424—195